(12) United States Patent
Mori et al.

(10) Patent No.: US 9,684,135 B2
(45) Date of Patent: Jun. 20, 2017

(54) OPTOELECTRICAL CONNECTOR AND PORTABLE ELECTRONIC DEVICE

(71) Applicant: JAPAN AVIATION ELECTRONICS INDUSTRY, LIMITED, Tokyo (JP)

(72) Inventors: Keiichi Mori, Tokyo (JP); Takayoshi Yamauchi, Tokyo (JP); Masuo Nishimoto, Tokyo (JP); Shuichi Aihara, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 14/905,367

(22) PCT Filed: Apr. 24, 2014

(86) PCT No.: PCT/JP2014/061621
§ 371 (c)(1),
(2) Date: Jan. 15, 2016

(87) PCT Pub. No.: WO2015/033613
PCT Pub. Date: Mar. 12, 2015

(65) Prior Publication Data
US 2016/0154185 A1    Jun. 2, 2016

(30) Foreign Application Priority Data

Sep. 9, 2013 (JP) .................................. 2013-186050
Nov. 28, 2013 (JP) .................................. 2013-245962
Feb. 14, 2014 (JP) .................................. 2014-026388

(51) Int. Cl.
*G02B 6/38* (2006.01)
*G02B 6/26* (2006.01)
(Continued)

(52) U.S. Cl.
CPC ............. *G02B 6/3817* (2013.01); *G02B 6/26* (2013.01); *G02B 6/3814* (2013.01);
(Continued)

(58) Field of Classification Search
CPC ...... G02B 6/3817; G02B 6/26; G02B 6/3814; G02B 6/3853; G02B 6/3897;
(Continued)

(56) References Cited

U.S. PATENT DOCUMENTS 4,427,879 A * 1/1984 Becher .................. G02B 6/2552
                                                              250/215
6,530,784 B1   3/2003 Yim et al.
(Continued)

FOREIGN PATENT DOCUMENTS

JP        57-82314          5/1982
JP        57-197009         12/1982
(Continued)

OTHER PUBLICATIONS

Official Action, along with English-language translation thereof, for TW Patent Appl. No. 103121366, dated Nov. 2, 2015.
(Continued)

*Primary Examiner* — Peter Radkowski
(74) *Attorney, Agent, or Firm* — Greenblum & Bernstein, P.L.C.

(57) ABSTRACT

In an optoelectrical connector including two connectors to be interconnected, each having at least one optical connection part and at least two electrical connection parts, the electrical connection parts of one of the connectors are pins and the electrical connection parts of the other connector are spring contacts. The connector having the spring contacts includes, before the spring contacts, positioning holes in which the pins are to be inserted. The tips of the pins come into contact with the spring contacts to make electrical
(Continued)

connection. The bases of the pins fit in the positioning holes to perform positioning for optical connection. The optoelectrical connector can be smaller, lighter, and thinner.

52 Claims, 17 Drawing Sheets

(51) Int. Cl.
| | | |
|---|---|---|
| G02B 6/42 | (2006.01) | |
| H01R 24/20 | (2011.01) | |
| H01R 24/28 | (2011.01) | |
| H01R 24/66 | (2011.01) | |
| H01R 24/76 | (2011.01) | |
| H01R 13/11 | (2006.01) | |

(52) U.S. Cl.
CPC ......... *G02B 6/3853* (2013.01); *G02B 6/3897* (2013.01); *G02B 6/4293* (2013.01); *G02B 6/4295* (2013.01); *H01R 24/20* (2013.01); *H01R 24/28* (2013.01); *H01R 24/66* (2013.01); *H01R 24/76* (2013.01); *G02B 6/3821* (2013.01); *G02B 6/3882* (2013.01); *G02B 6/4214* (2013.01); *G02B 2006/4297* (2013.01); *H01R 13/111* (2013.01)

(58) Field of Classification Search
CPC .. G02B 6/4293; G02B 6/4295; G02B 6/3821; G02B 6/3822; G02B 6/4214; G02B 2006/4297; H01R 24/20; H01R 24/28; H01R 24/66; H01R 24/76
See application file for complete search history.

(56) References Cited

U.S. PATENT DOCUMENTS

| | | | | |
|---|---|---|---|---|
| 6,863,452 B2* | 3/2005 | Takada | ................ | G02B 6/4292 385/93 |
| 7,245,794 B2* | 7/2007 | Ishizaka | ............... | G02B 6/4201 385/14 |
| 7,547,151 B2* | 6/2009 | Nagasaka | ............ | G02B 6/4214 385/53 |
| 8,057,106 B1* | 11/2011 | Zhovnirovsky | ........ | G02B 6/322 385/139 |
| 8,061,904 B1* | 11/2011 | Greenberg | ........... | G02B 6/3853 385/139 |
| 2003/0147602 A1* | 8/2003 | Takada | ................. | G02B 6/4292 385/93 |
| 2004/0165836 A1* | 8/2004 | Monson | ............... | G02B 6/4228 385/89 |
| 2006/0018606 A1* | 1/2006 | Ishizaka | ............... | G02B 6/4201 385/88 |
| 2008/0008426 A1* | 1/2008 | Nagasaka | ............ | G02B 6/4214 385/92 |
| 2010/0080563 A1* | 4/2010 | DiFonzo | ............. | G02B 6/3817 398/115 |
| 2011/0164851 A1* | 7/2011 | Ishigami | .............. | G02B 6/4292 385/93 |
| 2011/0200284 A1* | 8/2011 | Zhovnirovsky | .......... | G02B 6/32 385/33 |
| 2011/0286698 A1* | 11/2011 | Greenberg | ........... | G02B 6/4292 385/33 |
| 2012/0020629 A1* | 1/2012 | Shiratori | ................ | G02B 6/322 385/93 |
| 2012/0189248 A1* | 7/2012 | Hsu | ....................... | G02B 6/262 385/33 |

FOREIGN PATENT DOCUMENTS

| | | | |
|---|---|---|---|
| JP | 59-36724 | | 9/1984 |
| JP | 9-161873 | | 6/1997 |
| JP | 09161873 A | * | 6/1997 |
| JP | 2001-154760 | | 6/2001 |
| JP | 2011-233501 | | 11/2011 |
| JP | 2012-27275 | | 2/2012 |
| JP | 2013-152363 | | 8/2013 |
| JP | 2013152363 A | * | 8/2013 |
| TW | 201237483 | | 9/2012 |

OTHER PUBLICATIONS

International Search Report, along with English-language translation thereof, for PCT/JP2014/061621, dated Jun. 10, 2014.
Official Action, along with English-language translation thereof, in JP Appl. No. 2013-245962 dated Apr. 11, 2017.
Official Action, along with English-language translation thereof, in JP Appl. No. 2013-186050 dated Feb. 21, 2017.

* cited by examiner

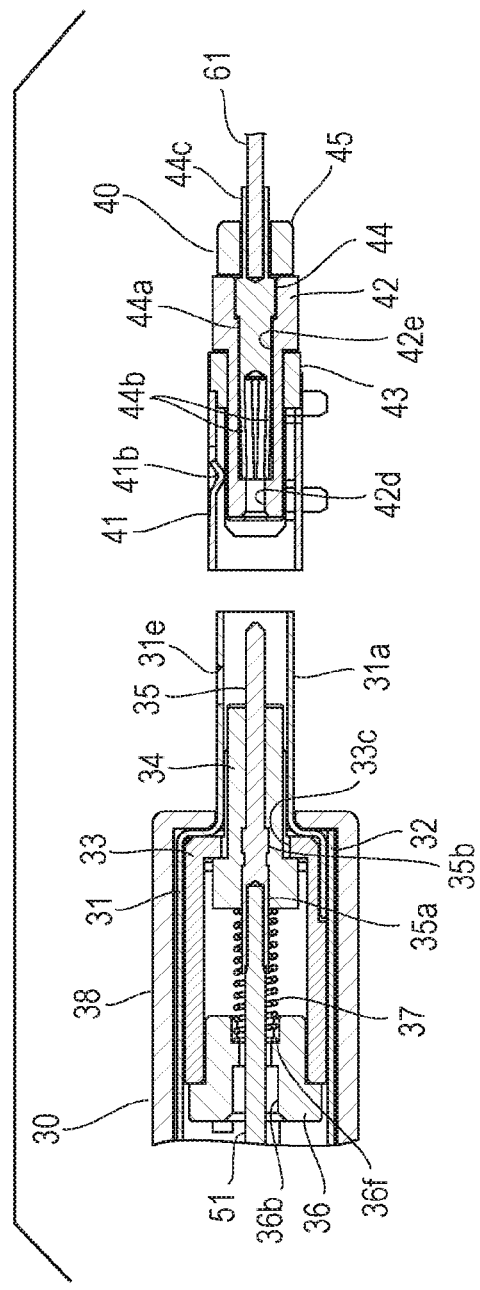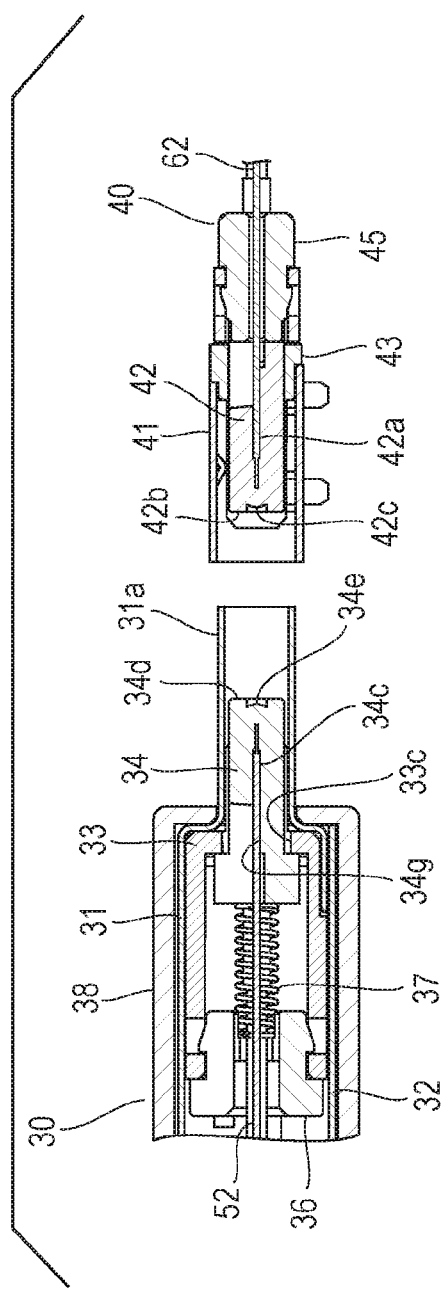
FIG. 5A
FIG. 5B

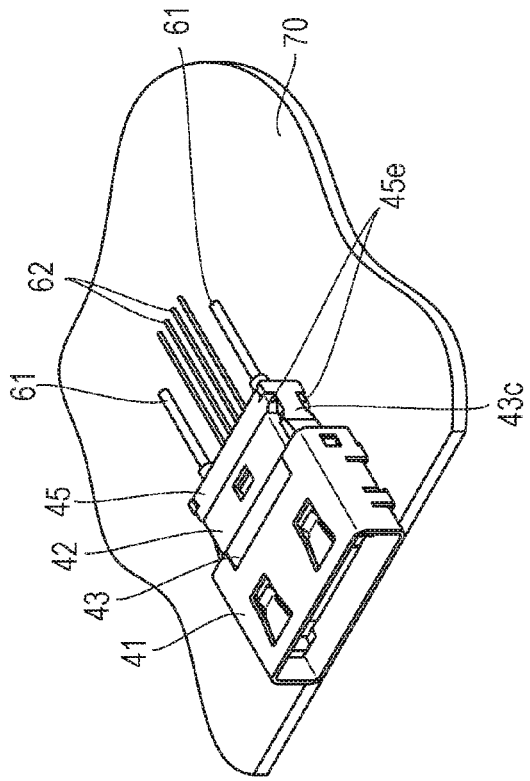
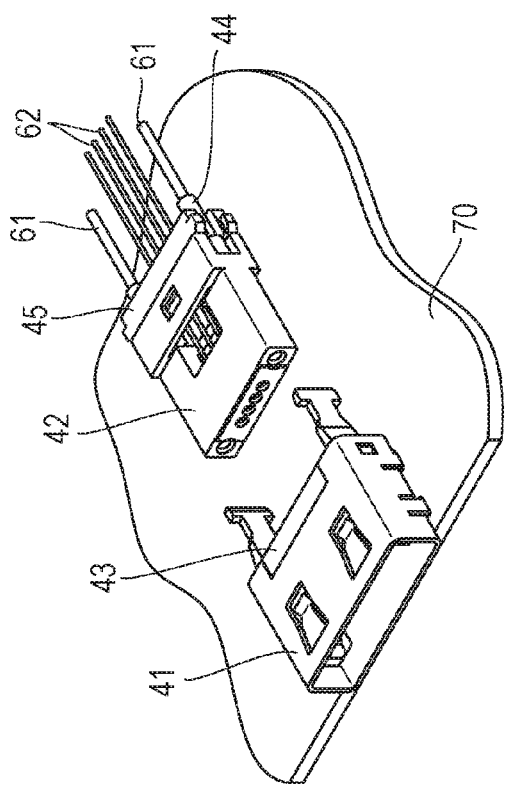
FIG. 9A
FIG. 9B

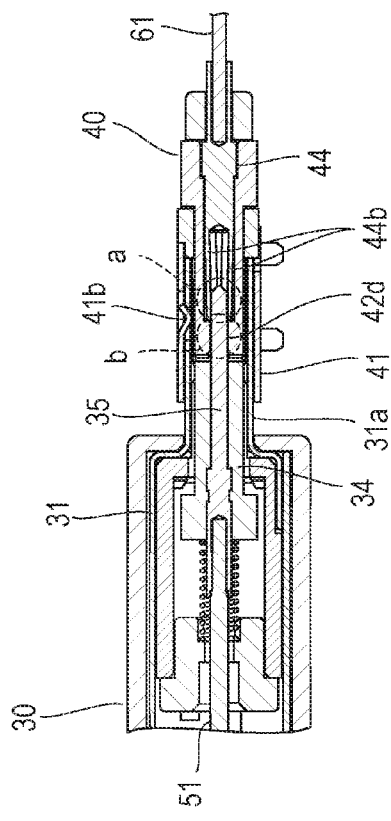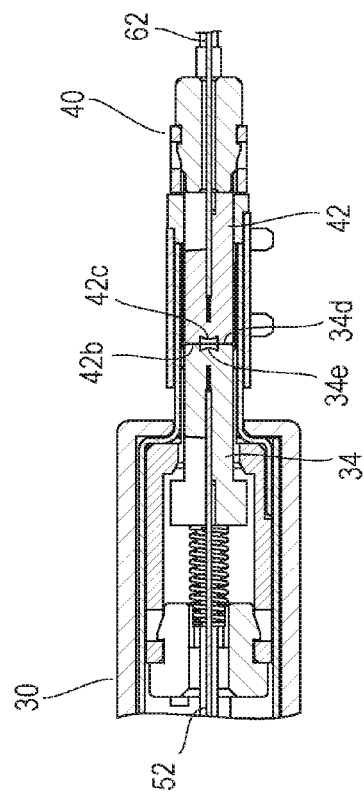
FIG. 11A
FIG. 11B

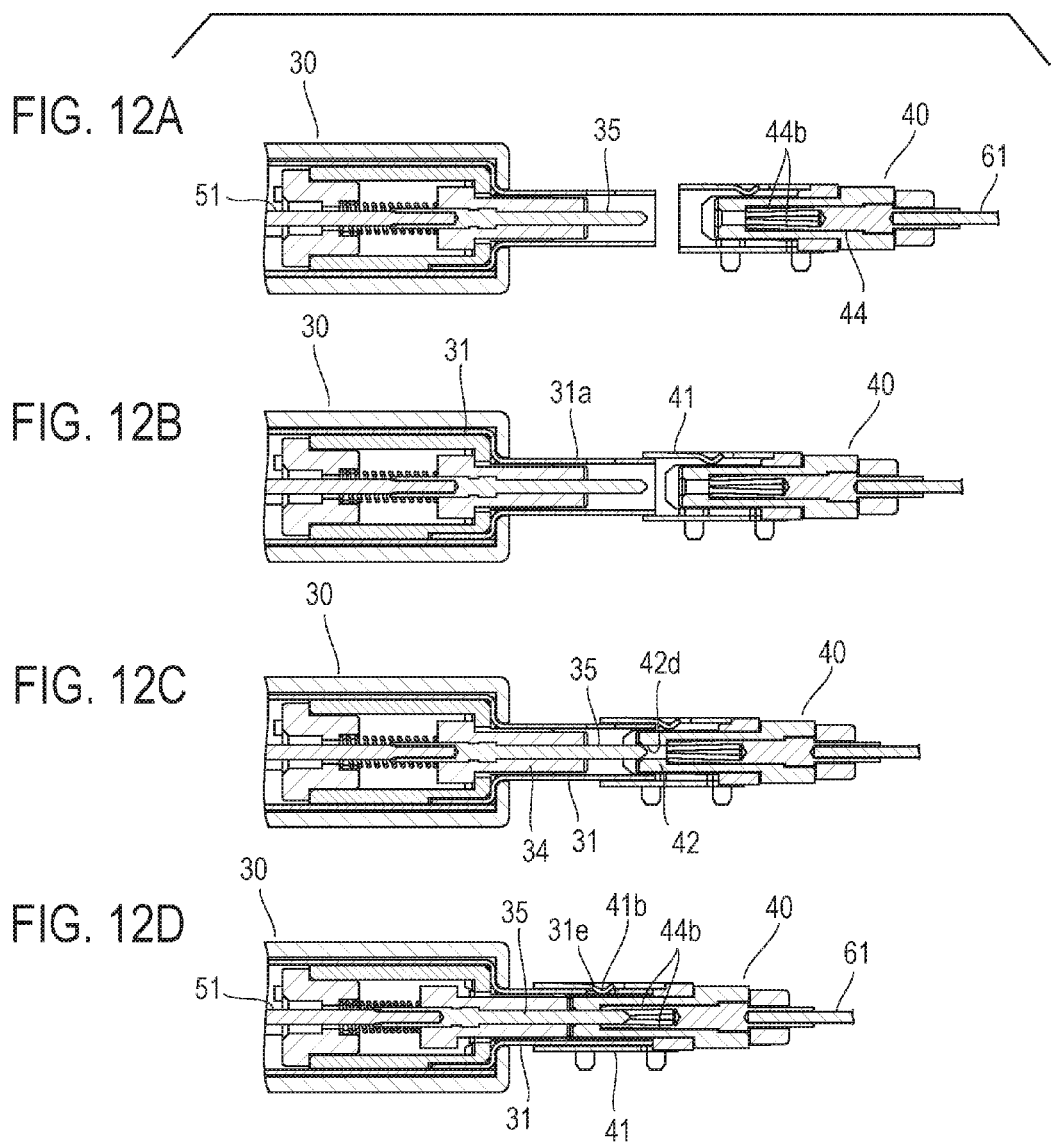

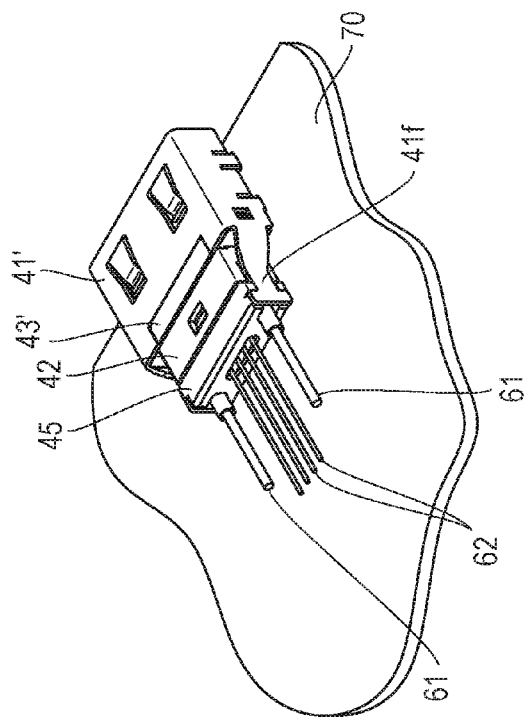
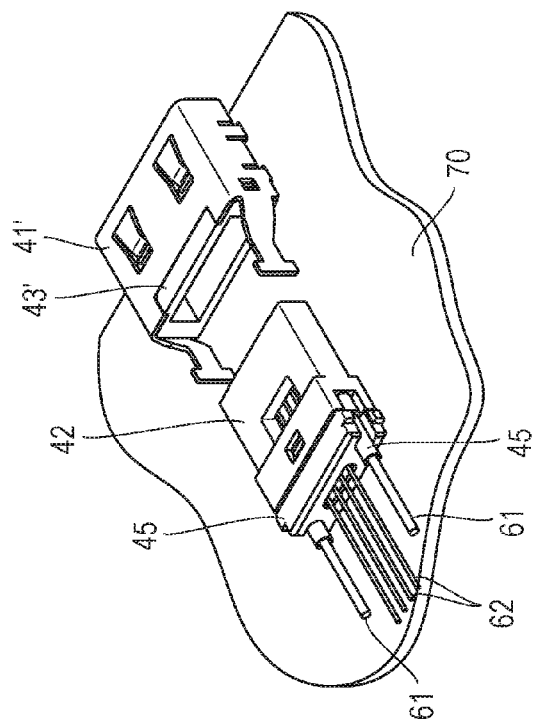

OPTOELECTRICAL CONNECTOR AND PORTABLE ELECTRONIC DEVICE

TECHNICAL FIELD

The present invention relates to an optoelectrical connector for making optical connection and electrical connection at the same time and a portable electronic device on which one of two connectors included in the optoelectrical connector is mounted.

BACKGROUND ART

FIGS. 1 and 2 show a configuration described in Patent Literature 1 as an example of prior art of an optoelectrical connector of this kind. FIG. 1 shows a receptacle, and FIG. 2 shows a cross-sectional structure of the receptacle and a cross-sectional structure of a USB connector to be connected with the receptacle. In FIG. 1, illustration of a metal shell is omitted.

A receptacle 10 includes a main body part 11 and an optical device part 12. The main body part 11 has a projecting part 11a and a housing part 11b. The projecting part 11a incorporates a plurality of conductors (connection conductors) 13. One end side of each conductor 13 is provided so as to be exposed on a surface of the projecting part 11a, and constitutes a connection part 13a. The other end side of each conductor 13 is drawn in a lower direction of the main body part 11.

The optical device part 12 is configured with a substrate 14, a lens case 15, and a mirror part 16. A light-emitting element 14a, a light-receiving element (hidden and invisible), and an IC chip 14b are mounted on the front end side of the substrate 14. A terminal 17 is inserted and connected in a through hole on the rear end side of the substrate 14.

The lens case 15 is positioned above the substrate 14 so as to cover the light-emitting element 14a, the IC chip 14b, and the like. Lens parts 15a and 15b are formed on the upper surface of the lens case 15. The mirror part 16 is positioned above the substrate 14 so as to be positioned on the top of the lens case 15 and has a mirror 16a and guide pins 16b and 16c. The guide pins 16b and 16c are provided so as to protrude from the front of the mirror part 16 in a front direction.

After the optical device part 12 is assembled, the receptacle 10 is configured by positioning the optical device part 12 in the housing part 11b of the main body part 11 and completed by inserting, in a metal shell 18, the main body part 11 with the optical device part 12 mounted.

On the other hand, an insertion part 21 of a USB connector 20 to be coupled with the receptacle 10 incorporates a ferrule 22. The ferrule 22 holds the tip portion of an optical fiber core (not shown). The tip of the ferrule 22 constitutes a lens 22a.

The receptacle 10 and the USB connector 20 are connected by sandwiching the USB connector 20 in the receptacle 10. The metal shell 18 has protrusion parts 18a and 18b provided. When the USB connector 20 is inserted in the receptacle 10, an upper surface 21a and a lower surface 21b of the insertion part 21 of the USB connector 20 abut against the protrusion parts 18a and 18b, thereby maintaining a connected state of the receptacle 10 and the USB connector 20.

Optical connection of the receptacle 10 is made through optical axis alignment with the USB connector 20 by the guide pins 16b and 16c. Leads of the USB connector 20 and the connection parts 13a of the receptacle 10 are also connected simultaneously with the optical connection. Through the optical connection, emitted light exiting the light-emitting element 14a is collimated by the lens part 15a, reflected by the mirror 16a, and incident on the lens 22a of the ferrule 22. Similarly, emitted light exiting the ferrule 22 is reflected by the mirror 16a, condensed by the lens part 15b, and incident on the light-receiving element.

PRIOR ART LITERATURE

Patent Literature

Patent literature 1: Japanese Patent Application Laid Open No. 2011-233501

SUMMARY OF THE INVENTION

Problems to be Solved by the Invention

Optoelectrical connectors have been used in various fields. Especially in the communications field, smartphones and tablets have become popular, and therefore there has been a demand for light, thin, and small optoelectrical connectors. However, a conventional optoelectrical connector (receptacle) having a configuration as described above requires dedicated guide pins for positioning for optical connection, aside from an optical connection part and an electrical connection part. It is difficult to make the conventional optoelectrical connector smaller because such guide pins are required.

An object of the present invention is to provide an optoelectrical connector that can be smaller, lighter, and thinner.

Means to Solve the Problems

According to a first aspect of the present invention, in an optoelectrical connector including two connectors to be interconnected, each having at least one optical connection part and at least two electrical connection parts, the electrical connection parts of one of the connectors are pins and the electrical connection parts of the other connector are spring contacts. The connector having the spring contacts includes, before the spring contacts, positioning holes in which the pins are to be inserted. The tips of the pins come into contact with the spring contacts to make electrical connection. The bases of the pins fit in the positioning holes to perform positioning for optical connection.

According to a second aspect of the present invention, in an optoelectrical connector including two connectors to be interconnected, each having at least one optical connection part and at least two electrical connection parts, the electrical connection parts of one of the connectors are first pins having spring contacts integrally formed with the tips and the electrical connection parts of the other connector are second pins. The connector having the second pins includes, before the second pins, positioning holes in which the first pins are to be inserted. The spring contacts at the tips of the first pins come into contact with the second pins to make electrical connection. The bases of the first pins fit in the positioning holes to perform positioning for optical connection.

Effects of the Invention

According to the present invention, the tips of pins that constitute electrical connection parts are used as contacts for electrical connection, and the bases of the pins are used for high-accuracy positioning for optical connection. Therefore, there is no need for dedicated guide pins for positioning for optical connection that have conventionally been required.

Thus, there is no need for space for positioning guide pins dedicated to positioning in one connector that constitutes an optoelectrical connector, and there is no need for space for fitting the guide pins dedicated to positioning in the other connector. Therefore, according to the present invention, the optoelectrical connector can be smaller, lighter, and thinner.

BRIEF DESCRIPTION OF THE DRAWINGS

FIG. 5A is a cross-sectional view for illustrating a configuration of electrical connection parts of the plug and the receptacle.

FIG. 5B is a cross-sectional view for illustrating a configuration of optical connection parts of the plug and the receptacle.

FIG. 9A is a diagram for illustrating how to mount the receptacle on a substrate.

FIG. 9B is a diagram for illustrating how to mount the receptacle on the substrate.

FIG. 11A is a cross-sectional view showing a connected state of the electrical connection parts shown in FIG. 5A FIG. 11B is a cross-sectional view showing a connected state of the optical connection parts shown in FIG. 5B.

FIG. 12A is a diagram for illustrating a process of fitting the plug and the receptacle.

FIG. 12B is a diagram for illustrating the process of fitting the plug and the receptacle.

FIG. 12C is a diagram for illustrating the process of fitting the plug and the receptacle.

FIG. 12D is a diagram for illustrating the process of fitting the plug and the receptacle.

FIG. 17A is a diagram for illustrating how to mount the receptacle shown in FIG. 14 on the substrate.

FIG. 17B is a diagram for illustrating how to mount the receptacle shown in FIG. 14 on the substrate.

DETAILED DESCRIPTION OF THE EMBODIMENTS

An embodiment of the present invention will now be described.

Figure 1:
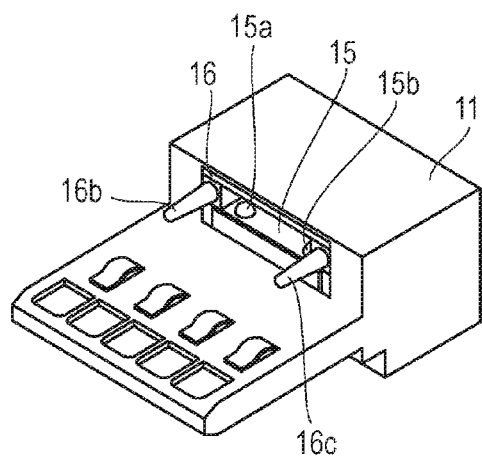
FIG. 1 is a perspective view showing an example of prior art of a receptacle.
Figure 2:
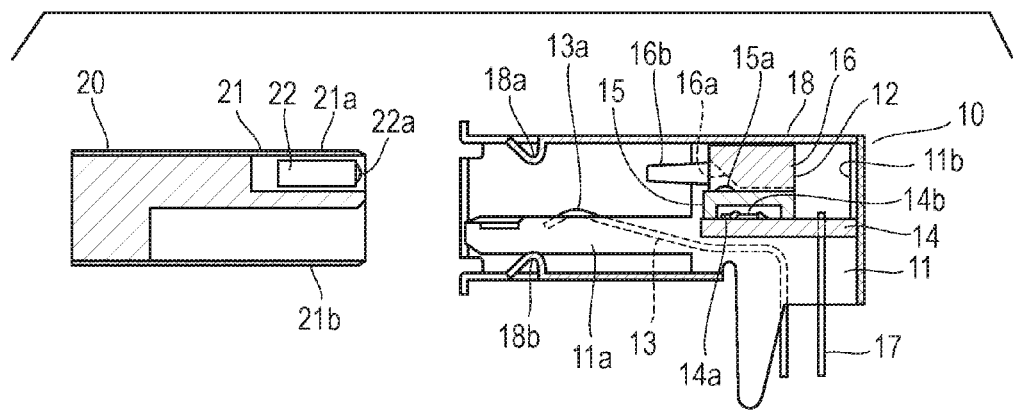
FIG. 2 is a cross-sectional view showing a configuration of a USB connector and a receptacle in an optoelectrical connector in prior art.
Figure 3:
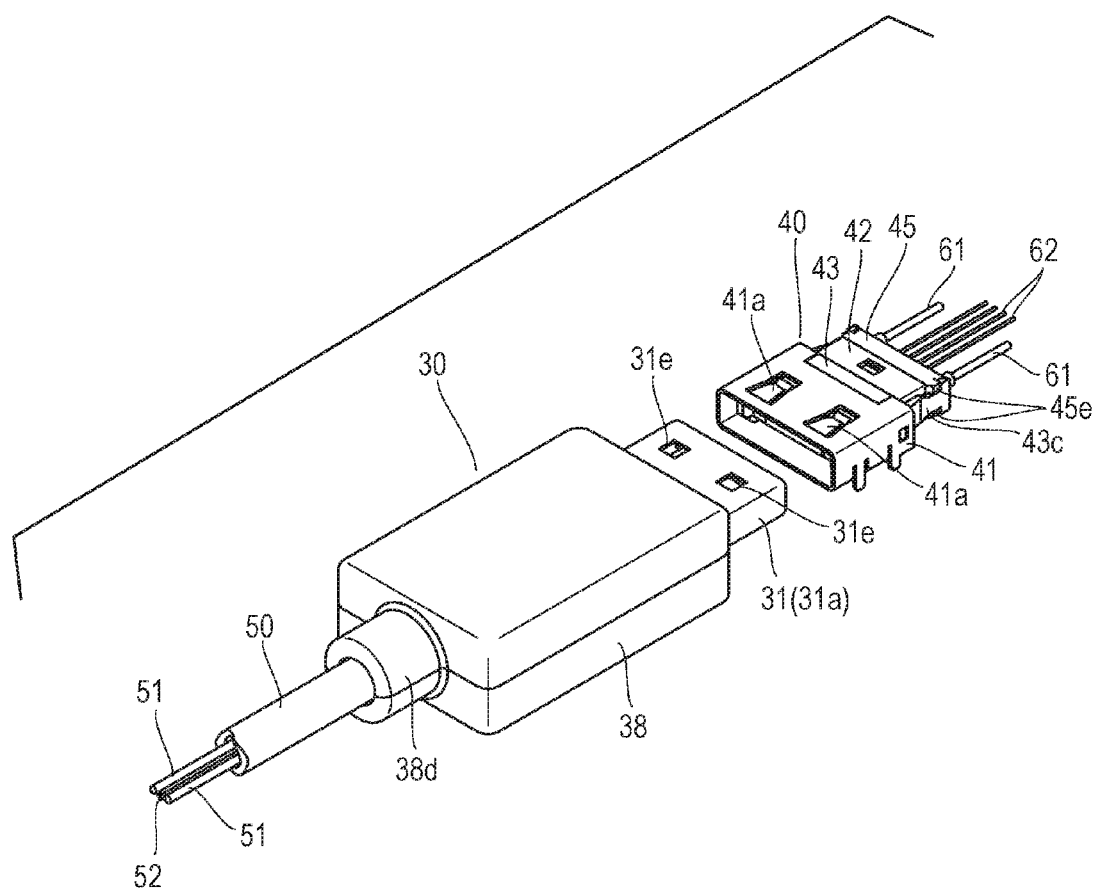
FIG. 3 is a perspective view showing an embodiment of an optoelectrical connector according the present invention.
Figure 4B:
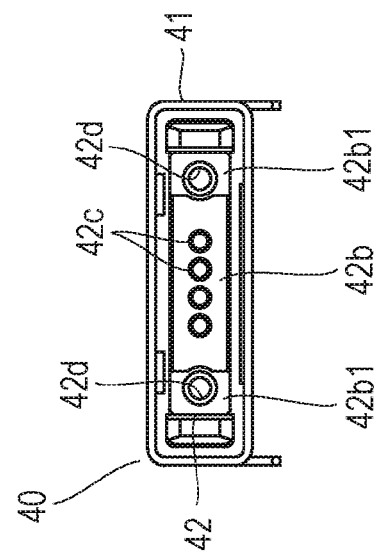
FIG. 4B is a front view of a receptacle that is the other connector of the optoelectrical connector shown in FIG. 3.
Figure 4A:
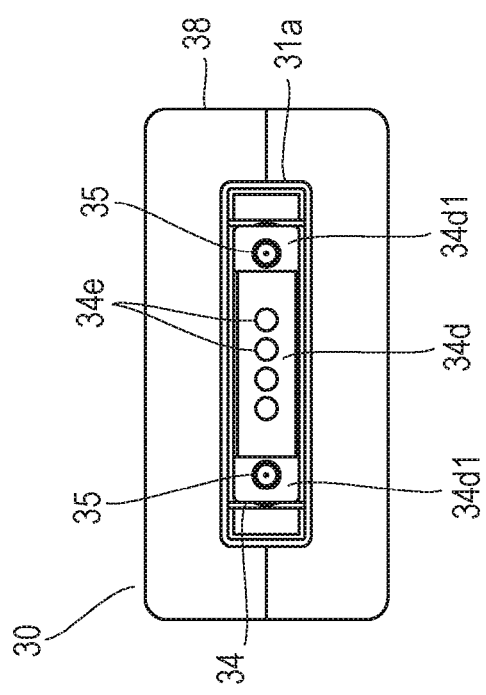
FIG. 4A is a front view of a plug that is one connector of the optoelectrical connector shown in FIG. 3.
Figure 6:
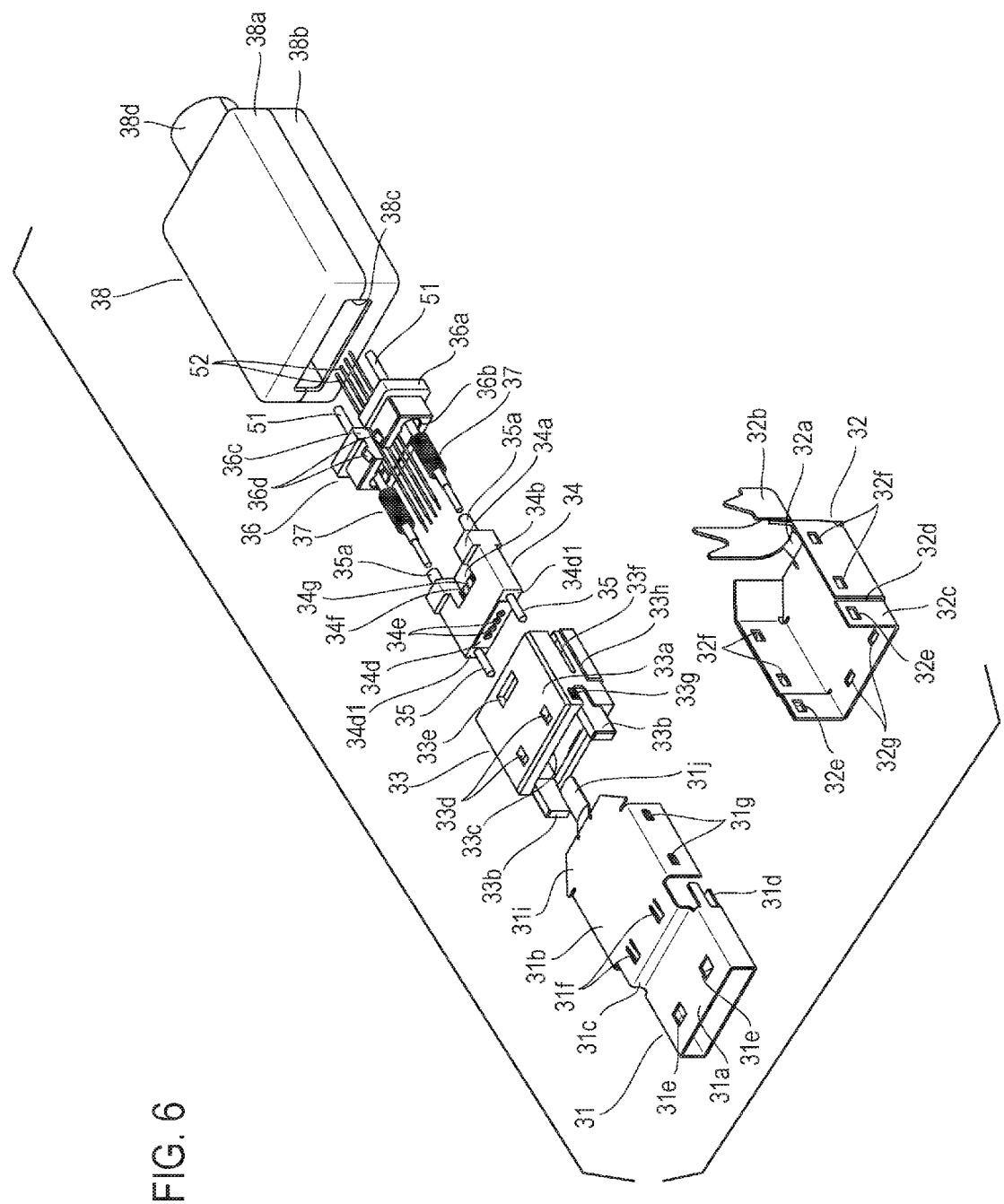
FIG. 6 is an exploded perspective view of the plug as viewed from the front side.
Figure 7:
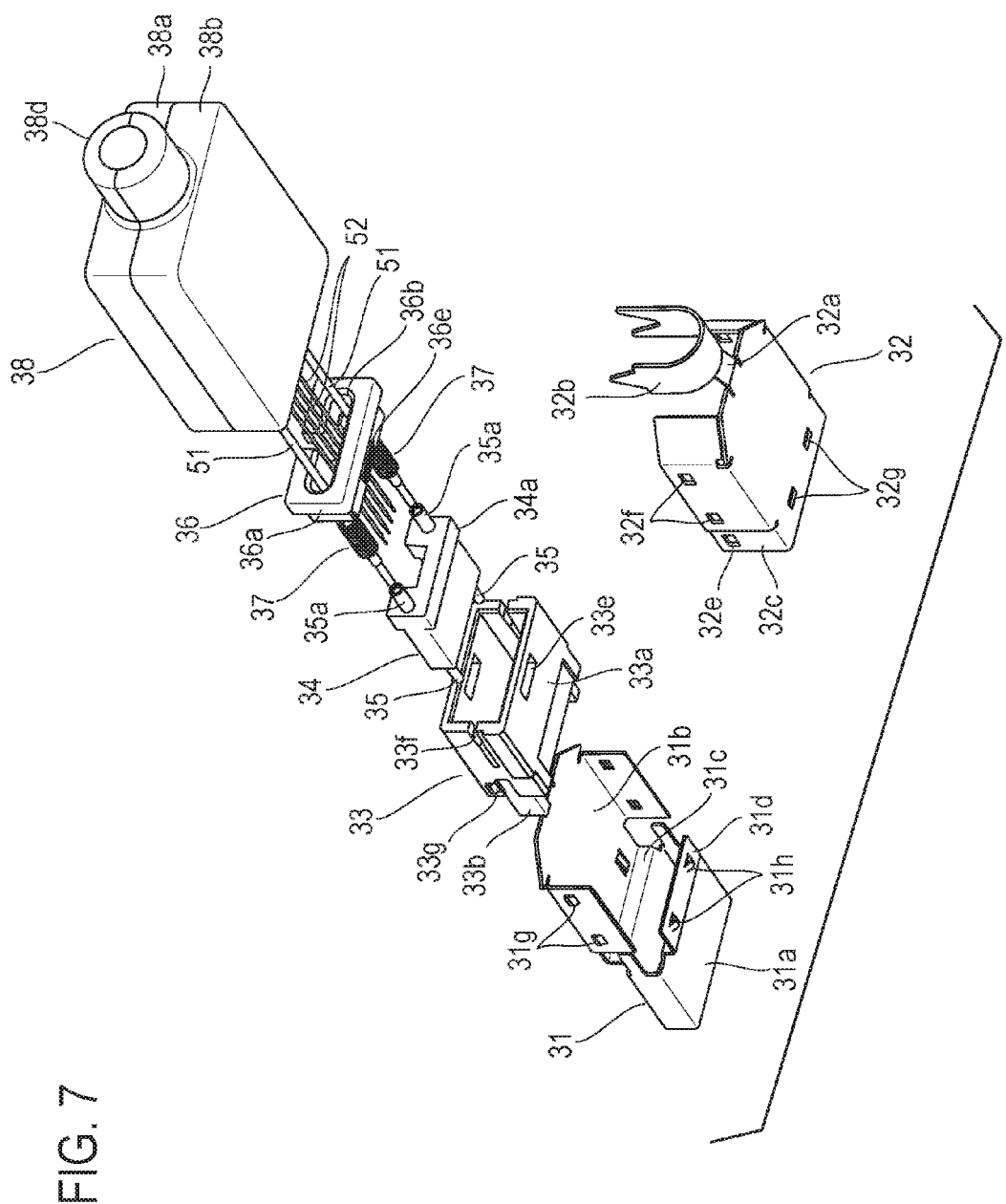
FIG. 7 is an exploded perspective view of the plug as viewed from the rear side.
Figure 8:
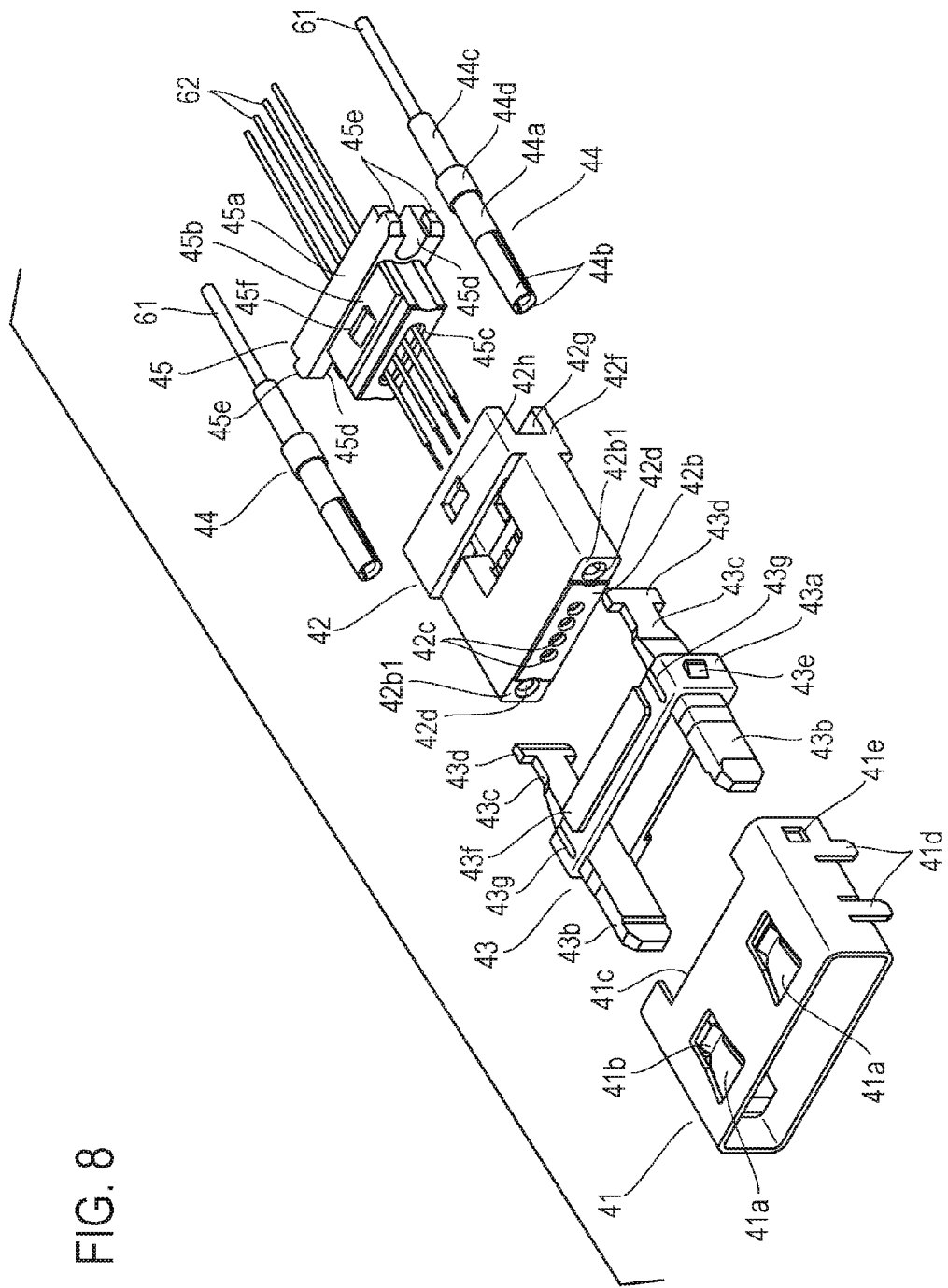
FIG. 8 is an exploded perspective view of the receptacle.

FIG. 3 shows the appearance of an embodiment of an optoelectrical connector according to the present invention. The optoelectrical connector is configured with two connectors, which are a plug 30 and a receptacle 40. FIGS. 4A and 4B show the plug 30 and the receptacle 40, respectively, as viewed from the front sides (the sides on which the plug 30 and the receptacle 40 are to be interconnected). FIGS. 5A and 5B show cross-sectional structures of main parts of the plug 30 and the receptacle 40. FIGS. 6 and 7 are exploded views showing parts of the plug 30. FIG. 8 is an exploded view showing parts of the receptacle 40.

A configuration of the plug 30 will first be described.

As shown in FIGS. 6 and 7, the plug 30 is configured with metal shells 31 and 32, a guide 33, an optical part 34, two pins 35, a block 36, two coil springs 37, and a housing 38. As shown in FIG. 3, the plug 30 is attached to an end of a cable 50. In this example, the cable 50 has two electric wires 51 and four optical fibers 52 internally.

In the metal shell 31, a fitting part 31a having a rectangular tube shape is included on the front side, and an enclosure part 31b having an open bottom surface and a U-shaped cross section with square corners is included on the rear side. The fitting part 31a and the enclosure part 31b are coupled by a coupling part 31c. The coupling part 31c is shaped such that the coupling part 31c is raised from the rear end of the upper surface of the fitting part 31a and then bent so as to be coupled to the upper surface of the enclosure part 31b. On the other hand, an extension part 31d is extendedly formed from the rear end of the lower surface of the fitting part 31a and has a line-symmetric shape with respect to the coupling part 31c.

A pair of windows 31c are formed on the upper surface of the fitting part 31a. In the coupling part 31c, a pair of spring pieces 31f are formed in portions positioned on an extension of the upper surface of the enclosure part 31b by cutting and raising the spring pieces 31f so as to protrude toward the inner surface side. A pair of protrusions 31g are protrusively formed on both sides of the enclosure part 31b, respectively, by cutting and raising the protrusions 31g, and a pair of protrusions 31h are protrusively formed on the lower surface of the extension part 31d by cutting and raising the protrusions 31h. A trapezoid-shaped extension part 31i is extendedly formed on the rear of the upper surface of the enclosure part 31b, and a strip-shaped protrusion piece 31j is protrusively formed on the tip of the extension part 31i.

The metal shell 32 is combined and integrated with the metal shell 31, and has an open upper surface and a U-shaped cross section with square corners. The rear end side of the metal shell 32 has a width gradually narrowed so as to match the trapezoid shape of the extension part 31i of the metal shell 31. A protrusion part 32a is protrusively formed on the rear end of the lower surface of the metal shell 32, and a cable fixing part 32b is formed on the tip of the protrusion part 32a. The cable fixing part 32b is U-shaped so that a cable can be crimped by surrounding the cable.

A narrow-width part 32c having a slightly narrowed width is provided on the front end side of the metal shell 32. Side walls behind the narrow-width part 32c and side walls of the narrow-width part 32c are divided by a slit 32d. Windows 32e are formed on both side walls of the narrow-width part 32c, respectively, and a pair of windows 32f are formed on both side walls behind the narrow-width part 32c, respectively. A pair of windows 32g are formed on the lower surface of the narrow-width part 32c.

The guide 33 is made of resin, and has a main body part 33a having a rectangular tube shape and a pair of positioning pieces 33b protrusively extended from the main body part 33a in the front direction. In the main body part 33a, an opening 33c on the front end side is narrowed, and the pair of positioning pieces 33b are positioned on the right and left sides of the opening 33c. A pair of recesses 33d are formed on the front end side of the upper surface of the main body part 33a, and windows 33e are formed on the rear end sides of the upper surface and the lower surface of the main body part 33a, respectively. Slits 33f are formed on both side walls of the main body part 33a, extending from the rear ends in the front direction, and protrusions 33g are protrusively formed on the front end sides of both side walls, respectively. Raised (laterally protruded) step parts 33h are formed on the lower end sides of both side walls, respectively.

The optical part 34 has a rectangular parallelepiped shape and a flange part 34a formed on the rear end so as to protrude in a vertical direction. The optical part 34 is made of resin that transmits light. A recess 34b is formed on the rear end side of the upper surface of the optical part 34. Microscopic pores 34c (see FIG. 5B), in which ends of the optical fibers 52 are to be inserted and fixed, are formed before the recess 34b. Four microscopic pores 34c are formed, and on a front end surface 34d of the optical part 34, a condenser lens 34e is formed in an area positioned on an extension of each microscopic pore 34c. The condenser lenses 34e are formed so as to be arranged in a longitudinal direction of the front end surface 34d. The condenser lenses 34e constitute an optical connection part. The condenser lenses 34e are formed in depressions provided in the front end surface 34d, and do not protrude from the front end surface 34d. On the other hand, on the internal bottom surface of the recess 34b, a raised step part 34f is formed in a portion close to the microscopic pores 34c. In the step part 34f, a V groove 34g is formed so as to be positioned on an extension of each microscopic pore 34c.

In the longitudinal direction of the front end surface 34d of the optical part 34, edge faces (front edge faces) 34d1 in portions positioned on both sides of the front end surface 34d are positioned slightly behind the front end surface 34d. Metal pins 35 constituting electrical connection parts are provided in the edge faces 34d1, respectively. In this example, the pins 35 are incorporated in the optical part 34 by insert molding.

The pins 35 are provided so as to pass through the optical part 34, and the tips of the pins 35 are protruded from the edge faces 34d1 of the optical part 34. The rear end sides of the pins 35 constitute tube parts 35a (see FIG. 5A), which have a tube shape, and are protruded in a rear direction of the optical part 34. A large-diameter part 35b (see FIG. 5A), which has a slightly large diameter, is provided in an intermediate part of each pin 35.

As resin of which the optical part 34 is made, polyetherimide (PEI), polycarbonate (PC), cyclic olefin copolymer (COC), or the like can be used, for example.

The block 36 has a rectangular parallelepiped shape and a flange part 36a formed on the rear end. The block 36 is made of resin. An oblong through hole 36b is formed through the block 36 in a front-rear direction. A notch 36c in communication with the through hole 36b is formed in the center of the upper surface in the front-rear direction throughout the length of the block 36. On the front end side of the upper surface, projections 36d are formed on both sides between which the notch 36c is formed, respectively. A projection 36e is formed on the front end side of the lower surface. In the inside of the through hole 36b, receiving parts 36f (see FIG. 5A), which receive the coil springs 37, are formed on the right and left sides so as to protrude toward the inner perimeter.

The housing 38 constitutes the outer shape of the plug 30 and has a rectangular parallelepiped shape. The housing 38 is configured with two bodies: an upper housing 38a and a lower housing 38b. Although detailed illustration is omitted, the upper housing 38a and the lower housing 38b are fixedly integrated when these housings are combined and pressed against each other and lugs of one housing catch in the other. An opening 38c is formed on the front of the housing 38, and a cylinder part 38d in which cable 50 is to be inserted is protrusively formed on the rear.

Assembly of the plug 30 will now be described in sequence.

(1) The electric wires 51 and the optical fibers 52 taken from the cable 50 are passed through the through hole 36b of the block 36.

(2) The end of each optical fiber 52 is inserted, bonded, and fixed in each microscopic pore 34c of the optical part 34. At this time, a portion in which the optical fiber 52 is positioned in each V groove 34g is also bonded and fixed.

(3) Each electric wire 51 is passed through the inside of each coil spring 37 to position the coil spring 37 around the electric wire 51. Then, the end of the electric wire 51 is inserted in the tube part 35a of each pin 35 to connect the electric wire 51 to the pin 35. The connection is made by crimping the tube part 35a.

(4) The pair of positioning pieces 33b are inserted in the fitting part 31a of the metal shell 31 to position the main body part 33a of the guide 33 in the enclosure part 31b of the metal shell 31. The metal shell 32 is attached from underneath so that the main body part 33a is put between the metal shells 31 and 32. The four protrusions 31g of the metal shell 31 in total are fitted in the windows 32f of the metal shell 32, respectively. The pair of protrusions 31h of the metal shell 31 are fitted in the windows 32g of the metal shell 32, respectively. Thus, the metal shells 31 and 32 are fixedly integrated with each other. The pair of spring pieces 31f of the metal shell 31 are fitted in the pair of recesses 33d of the guide 33, respectively. The pair of protrusions 33g of the guide 33 are fitted in the windows 32e of the metal shell 32, respectively. Accordingly, the guide 33 is positioned and fixed in the metal shells 31 and 32. The lower ends of both sides of the enclosure part 31b of the metal shell 31 abut against the step parts 33h of the guide 33.

(5) The optical part 34 is inserted in the guide 33 from the rear direction, and the block 36 is fitted in the guide 33 from the rear direction. The pair of projections 36d on the upper surface of the block 36 and the projection 36e on the lower side are fitted in the windows 33e of the guide 33, respectively. Thus, the block 36 is fixed to the guide 33 so as to be prevented from dropping off. The two coil springs 37 are put between the rear end surface of the optical part 34 and the receiving parts 36f provided in the through hole 36b. The optical part 34 is pushed by the coil springs 37 in a direction in which the optical part 34 protrudes from the opening 33c of the guide 33, and the front end side of the optical part 34 is positioned in the fitting part 31a of the metal shell 31. The optical part 34 has the flange part 34a provided, and the flange part 34a abuts against the inner surface of the front end of the guide 33 to prevent the optical part 34 from dropping off the guide 33.

(6) The cable 50 is fixed in the metal shells 31 and 32. The fixing is performed by positioning the cable 50 in the U shape of the cable fixing part 32b of the metal shell 32, and then by positioning the protrusion piece 31j of the metal shell 31 on the cable 50 and bending both ends of the U shape of the cable fixing part 32b into the inside. Thus, the cable 50 is crimped and fixed by the metal shells 31 and 32.

(7) Finally, the housing 38 constituting the outer shape of the plug 30 is attached. The fitting part 31a of the metal shell 31 is protruded from the opening 38c of the housing 38. The cable 50 is drawn from the cylinder part 38d of the housing 38 to the outside.

The plug 30 shown in FIGS. 3, 4A, 5A, and 5B are completed as described above. In the example described above, the pins 35 are incorporated in the optical part 34 by insert molding. Instead, the pins 35 may be incorporated in the optical part 34 by press fitting.

A configuration of the receptacle 40 will next be described.

As shown in FIG. 8, the receptacle 40 is configured with a metal shell 41, an optical part 42, a heat-resistant guide 43, two sockets 44, and a block 45. Two electric wires 61 and four optical fibers 62 are attached to the receptacle 40.

The metal shell 41 has a rectangular tube shape and a pair of spring pieces 41a formed on the upper surface. A protrusion 41b is formed on the tip of each spring piece 41a so as to protrude toward the inside of the metal shell 41. A notch 41c is formed on the rear end of the upper surface. Terminals 41d are formed in both side wall portions of the metal shell 41 so as to be protrusively extended from the side walls in a lower direction. A pair of terminals 41d are formed in both side wall portions, respectively. Windows 41e are formed on the rear end sides of both side walls, respectively.

The heat-resistant guide 43 has a rectangular frame part 43a, a pair of guide pieces 43b protrusively extended from both side wall portions of the frame part 43a in a front direction, respectively, and a pair of lock pieces 43c protrusively extended from both side wall portions of the frame part 43a in a rear direction, respectively. A lock part 43d having a wide width is formed on the tip of each lock piece 43c. Projections 43e are formed on the outer surfaces of both side walls of the frame part 43a, respectively. A raised step part 43f is formed on the upper surface of the frame part 43a. Ridges 43g are formed on both sides of the step part 43f, respectively.

The optical part 42 has a rectangular parallelepiped shape and microscopic pores 42a (see FIG. 5B) formed, in which ends of the optical fibers 62 are to be inserted and fixed. Four microscopic pores 42a are formed, and on a front end surface 42b of the optical part 42, a condenser lens 42c is formed in an area positioned on an extension of each microscopic pore 42a. The condenser lenses 42c are formed so as to be arranged in a longitudinal direction of the front end surface 42b. The condenser lenses 42c constitute optical connection parts. The condenser lenses 42c are formed in depressions provided in the front end surface 42b, and do not protrude from the front end surface 42b. An arrangement pitch of the four condenser lenses 42c is identical to an arrangement pitch of the four condenser lenses 34e of the plug 30.

In the longitudinal direction of the front end surface 42b of the optical part 42, edge faces 42b1 in portions positioned on both sides of the front end surface 42b are positioned slightly behind the front end surface 42b. Positioning holes 42d are formed in the edge faces 42b1, respectively. In the inner part of each positioning hole 42d, an attachment hole 42e (see FIG. 5A) is formed following the positioning hole 42d.

A flange part 42f is formed on the rear end of the optical part 42 so as to protrude in a vertical direction. A groove 42g is formed on the rear end surface of the flange part 42f throughout the length of the rear end surface in a horizontal direction (longitudinal direction). The microscopic pores 42a and the attachment holes 42e are open on the bottom surface of the groove 42g. The flange part 42f is divided into upper and lower portions by the groove 42g, and windows 42h are formed in the upper and lower portions of the flange part 42f, respectively.

The block 45 includes a base part 45a and a protrusion part 45b protruded from the base part 45a in the front direction. An oblong through hole 45c is formed through a portion from the base part 45a to the protrusion part 45b. Oblong notches 45d are formed on both sides of the base part 45a, respectively. On both sides of the base part 45a, lugs 45e are protrusively formed in upper and lower portions between which the oblong notches 45d are formed, respectively. Projections 45f are formed on the upper surface and the lower surface of the protrusion part 45b, respectively.

Each socket 44 has an axial intermediate part 44a, and a pair of spring contacts 44b constituting an electrical connection part are formed before the intermediate part 44a so as to be protruded from the intermediate part 44a. Each spring contact 44b has a substantially semicircular cross section and is a cantilevered. The pair of spring contacts 44b are formed so as to face each other. The tip sides of the spring contacts 44b are close to each other and become narrower. A tube part 44c, which has a tube shape, is constituted behind the intermediate part 44a of the socket 44. A large-diameter part 44d, which has a slightly large diameter, is provided in the rear end side of the intermediate part 44a.

Constituent materials of the receptacle parts will now be illustrated.

Metal shell 41: stainless steel
Heat-resistant guide 43: liquid crystal polymer (LCP), polyphenylene sulfide (PPS), or the like <heat-resistant material>
Optical part 42: PEI, PC, COC, or the like <resin that transmits light>
Block 45: LCP, PPS, polybutylene terephthalate (PBT), polyamide (PA), or the like <there is no particular need for heat resistance>
Socket 44: copper alloy Assembly of the receptacle 40 will next be described in sequence.

(1) The optical fibers 62 are passed through the through hole 45c of the block 45.

(2) The end of each optical fiber 62 is inserted, bonded, and fixed in each microscopic pore 42a of the optical part 42.

(3) The end of each electric wire 61 is inserted in each tube part 44c of the socket 44 and connected by soldering.

(4) The tube parts 44c of the sockets 44 are inserted in the two oblong notches 45d of the block 45, respectively, to integrate the block 45 and the two sockets 44. The large-diameter parts 44d of the sockets 44 are positioned on the front of the base part 45a of the block 45, and the large-diameter parts 44d abut against the front of the base part 45a, thereby controlling movement of the sockets 44 in the rear direction.

(5) The protrusion part 45b of the block 45 holding the socket 44 is fitted in the groove 42g of the optical part 42 from the rear direction. The two projections 45f in the upper and lower portions of the block 45 are positioned and catch in the windows 42h, respectively. Thus, the block 45 and the optical part 42 are fixed to each other. The two sockets 44 are inserted in the attachment holes 42e of the optical part 42 and brought to a state shown in FIG. 5A.

(6) The heat-resistant guide 43 is incorporated in the metal shell 41 from the rear direction. The two projections 43e provided in the heat-resistant guide 43 are positioned and catch in the windows 41e of the metal shell 41, respectively. Thus, the metal shell 41 and the heat-resistant guide 43 are fixed to each other. The step part 43f of the heat-resistant guide 43 is fitted in the notch 41c of the metal shell 41. The guide pieces 43b of the heat-resistant guide 43 are positioned in the metal shell 41, and the two lock pieces 43c are protruded in a rear direction of the metal shell 41.

(7) The optical part 42 with the block 45 attached is fitted, from the rear direction, in the heat-resistant guide 43 attached to the metal shell 41. The lock parts 43d on the tips of the pair of lock pieces 43c of the heat-resistant guide 43 catch in the lugs 45e that are formed on both sides of the base part 45a of the block 45, respectively. Thus, the optical part 42 is fixed to the heat-resistant guide 43 and housed in the metal shell 41. The optical part 42 is positioned so as to be surrounded by the frame part 43a of the heat-resistant guide 43.

The receptacle 40 shown in FIGS. 3, 4B, 5A, and 5B are completed as described above.

As described above, the receptacle 40 is completed when the optical part 42 in which the optical fibers 62, the block 45, the sockets 44, and the electric wires 61 are assembled is finally housed in the heat-resistant guide 43 incorporated in the metal shell 41. That is, the receptacle 40 is completed when the optical part 42 is housed in a housing part for housing the optical part 42. The optical part 42 is fixed to the housing part when the pair of lock pieces 43c provided in the heat-resistant guide 43 catch in the lugs 45e formed in the block 45. The adoption of this lock mechanism including the lock pieces 43c and the lugs 45e enables the optical part 42 to be easily attached to and detached from the housing part. Thus, this example has advantages as described below.

That is, the receptacle 40 is mounted on a substrate, but when a reflow technology is used for mounting, the receptacle 40 is exposed to a high temperature of, for example, 250° C. Such a reflow temperature exceeds the heat-resistant temperature of the optical part 42, the optical fibers 62, and so on. Accordingly, the optical part 42 and the optical fibers 62 are thermally-deteriorated, leading to impaired performance. In addition, a reflow atmosphere contaminated with dust, gas, or the like contaminates the optical part 42, leading to impaired performance.

Figure 10A:
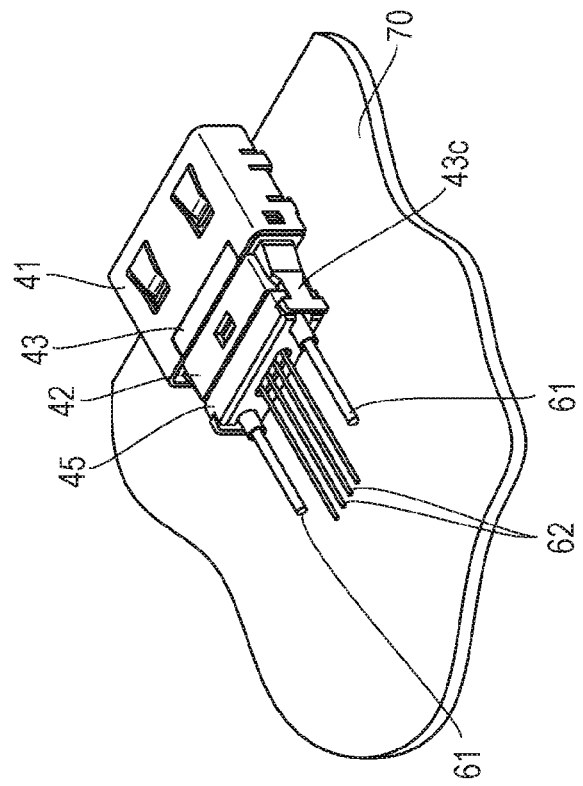
FIG. 10A is a diagram for illustrating how to mount the receptacle on the substrate.
Figure 10B:
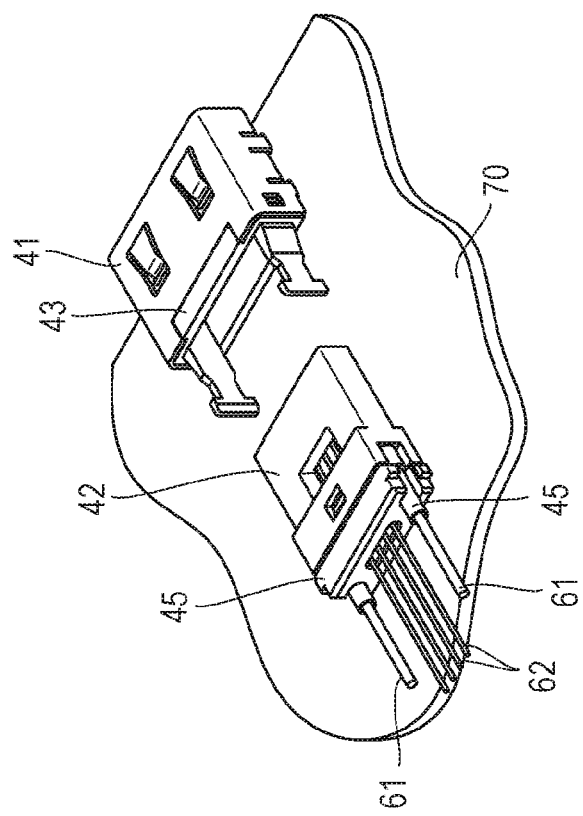
FIG. 10B is a diagram for illustrating how to mount the receptacle on the substrate.

In this example, because the optical part 42 can be attached and detached, it is possible to work around such serious problems. FIGS. 9A, 9B, 10A, and 10B show how reflow mounting is performed. When the receptacle 40 is reflow-mounted on a substrate 70, the optical part 42 in which the optical fibers 62, the block 45, the sockets 44, and the electric wires 61 are assembled is detached from the housing part (the metal shell 41 in which the heat-resistant guide 43 is incorporated). The housing part is reflow-mounted on the substrate 70 as shown in FIGS. 9A and 10A. After the mounting, the optical part 42 is attached as shown in FIGS. 9B and 10B. Thus, the receptacle 40 can be reflow-mounted on the substrate 70 without impairment of the performance of the optical part 42 and the optical fibers 62.

The optical part 42 can be repeatedly attached to and detached from the housing part. Therefore, if a defect occurs in the optical part 42, for example, the optical part 42 can be repaired easily.

FIGS. 11A and 11B show a state in which the receptacle 40 and the plug 30 having the configurations as described above are fitted and electrical connection is made and a state in which the receptacle 40 and the plug 30 are fitted and optical connection is made, respectively. FIGS. 11A and 11B correspond to FIGS. 5A and 5B, respectively. Illustration of the substrate 70 is omitted.

As shown in FIG. 11A, the electrical connection is made when each pin 35 of the plug 30 is inserted in each positioning hole 42d of the receptacle 40 and further inserted between each pair of spring contacts 44b, and the tip of the pin 35 is put between the pair of spring contacts 44b. The fitting part 31a of the metal shell 31 of the plug 30 is fitted in the metal shell 41 of the receptacle 40 and comes into contact with the metal shell 41, thereby making ground connection.

As shown in FIG. 11B, the optical connection is made when the front end surface 34d of the optical part 34 of the plug 30 and the front end surface 42b of the optical part 42 of the receptacle 40 abut against each other and each condenser lens 34e and each condenser lens 42c face each other. In this example, both condenser lenses 34e and 42c do not protrude from the front end surfaces 34d and 42b, and there is no contact between the condenser lenses. The optical connection is made through space coupling by the condenser lenses 34e and 42c.

Positioning with extremely high accuracy is required for the optical connection. In this example, the receptacle 40 has the positioning holes 42d provided before the spring contacts 44b. High-accuracy positioning for the optical connection is performed when each pin 35 of the plug 30 is inserted in each positioning hole 42d and the base of the pin 35 is fitted in the positioning hole 42d as shown in FIG. 11A.

As described above, in this example, the tip of each pin 35 constituting the electrical connection part comes into contact with the spring contacts 44b to make the electrical connection. The base of the pin 35 is used for positioning for the optical connection. In a connection direction, positioning is performed on substantially the same positions as the positions of the optical connection parts (the positions of the condenser lenses 34e and 42c), thereby enabling high-accuracy positioning. Specifically, in FIG. 11A, the tip of the pin 35 in the present invention denotes an electrical connection function part in a portion enclosed by a broken line a, and the base of the pin 35 denotes a positioning function part for the optical connection in a portion enclosed by a broken line b. Therefore, the electrical connection function part and the positioning function part for the optical connection may not positioned on the tip and base of a physical pin, respectively, provided that the function parts are positioned in a positional relationship in FIG. 11A.

FIGS. 12A to 12D show a process of fitting the plug 30 and the receptacle 40 in sequence. FIG. 12A shows a state before the fitting is performed.

When the plug 30 and the receptacle 40 are connected, the metal shell 31 of the plug 30 and the metal shell 41 of the receptacle 40 are first fitted as shown in FIG. 12B. The plug 30 and the receptacle 40 are substantially positioned by the fitting between the metal shells. This facilitates insertion of the pins 35 of the plug 30 in the positioning holes 42d of the receptacle 40 shown in FIG. 12C. The optical part 34 of the plug 30 adopts a floating structure capable of slightly moving with respect to the metal shell 31 so that the pair of pins 35 provided in the optical part 34 are inserted in the positioning holes 42d successfully with no problem.

When the fitting is further advanced, the front end surface 34d of the optical part 34 is pressed against the front end surface 42b of the optical part 42. This corrects an angular difference between the optical parts and sets a fitting completion state shown in FIG. 12D, completing the electrical connection and optical connection. The protrusions 41b on the tops of the spring pieces 41a formed in the metal shell 41 of the receptacle 40 are fitted in the windows 31e formed in the metal shell 31 of the plug 30. Thus, the receptacle 40 is prevented from dropping off and the fitted state is maintained.

In the example described above, the plug 30 and the receptacle 40 have the four optical connection parts and the two electrical connection parts. However, there is no particular limitation on the number of optical connection parts. On the other hand, the number of electrical connection parts, that is, number of pins 35 is at least two. As shown in the example described above, when the two pins 35 are positioned on both sides of the plug 30 so that the optical connection parts are put between the pins 35, positioning for the optical connection can be performed with higher accuracy.

In the electrical connection by contact between the pins 35 and the spring contacts 44b, there is a danger that contact or rubbing between the metals may cause metal abrasion powder to occur. However, the pins 35 and the spring contacts 44b come into contact in a position deeper than the positioning holes 42d used for high-accuracy positioning for the optical connection, and therefore metal abrasion powder is less likely to adhere to the inner side walls of the positioning holes 42d. In addition, because the pins 35 are inserted in the positioning holes 42d, resin abrasion powder, dust, or the like that occurs due to rubbing may adhere to and remain in, for example, the edge faces 34d1 of the optical part 34 in which the pins 35 are provided or the edge faces 42b1 of the optical part 42 in which the positioning holes 42d are provided. However, the edge faces 34d1 and 42b1 are positioned behind the front end surfaces 34d and 42b used for the optical connection, respectively, and therefore the optical connection is not affected even if resin abrasion powder, dust, or the like adheres and remains.

Figure 13A:
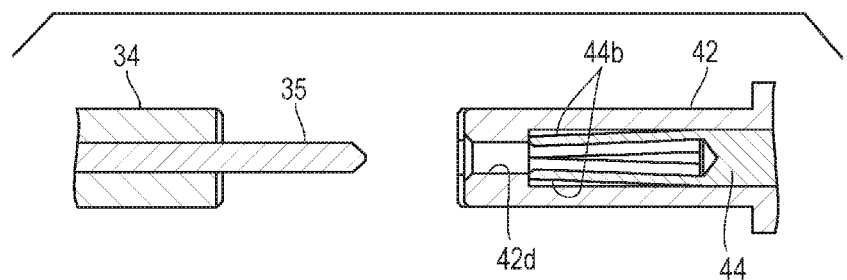
FIG. 13A is a cross-sectional view showing a configuration of main parts of the electrical connection parts.
Figure 13B:
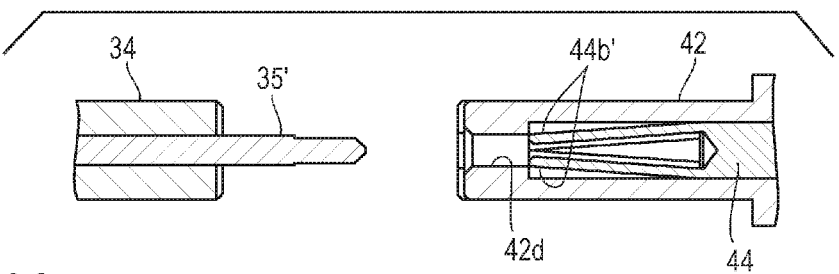
FIG. 13B is a cross-sectional view showing another configuration example-1 of electrical connection parts.
Figure 13C:
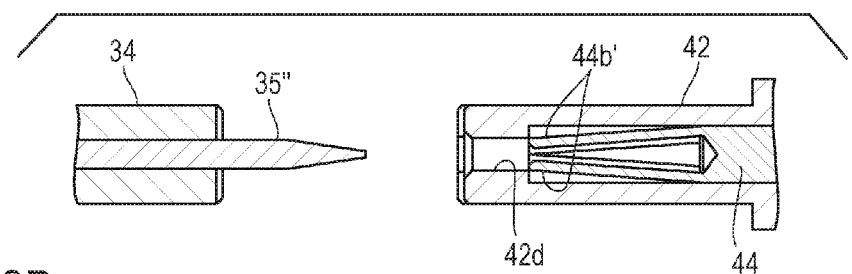
FIG. 13C is a cross-sectional view showing another configuration example-2 of electrical connection parts.
Figure 13D:
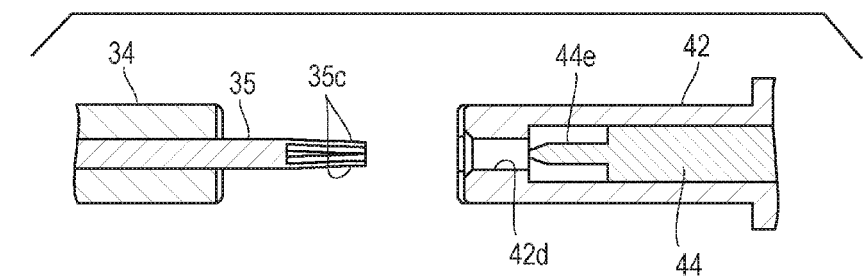
FIG. 13D is a cross-sectional view showing another configuration example-3 of electrical connection parts.

FIG. 13A is an enlarged view showing the electrical connection parts of the plug 30 and the receptacle 40 described above. FIGS. 13B to 13D show other configuration examples of electrical connection parts.

In FIG. 13B, a diameter of the tip of a pin 35' is smaller than a diameter of the base, and insertion space for the pin 35' made by the tips of a pair of spring contacts 44b' is narrower than that shown in FIG. 13A accordingly. In FIG. 13C, the spring contacts 44b' are similar to those in FIG. 13B, and the tip of a pin 35" has a tapered shape.

When the pins 35' and 35" having such shapes are adopted, the pins 35' and 35" can be easily inserted in the positioning holes 42d even when a gap (clearance) in fitting between the base portions of the pins 35' and 35" and the positioning holes 42d is smaller, in order to perform high-accuracy positioning.

In FIG. 13D, an electrical connection part provided on the side of the receptacle 40 is constituted not by the spring contacts 44b, but by a pin (second pin) 44e, and spring contacts 35c are integrally formed with the tip of the pin (first pin) 35 on the side of the plug 30. This configuration may also be adopted. In a plane orthogonal to an extension direction of the pin 35, a diameter of a region occupied by the pair of spring contacts 35c is smaller than a diameter of the base of the pin 35. Thus, the pin 35 having the spring contacts 35c on the tip can also be inserted in the positioning hole 42d successfully. In this example, electrical connection is made when the spring contacts 35c of the pin 35 of the plug 30 and the pin 44e of the receptacle 40 come into contact.

In the embodiment described above, the lenses are provided in both optical connection parts to be interconnected. However, lenses may be provided in one optical connection part, or no lenses may be provided. For example, if there are no lenses, edge faces of the optical fibers 52 and 62 abut against each other.

In the receptacle 40 described above, the lock mechanism by which the optical part 42 in which the optical fibers 62, the block 45, the sockets 44, and the electric wires 61 are assembled is fixed to the housing part (the metal shell 41 in which the heat-resistant guide 43 is incorporated) includes the lock pieces 43c provided in the heat-resistant guide 43 and the lugs 45e of the block 45. However, lock pieces may also be provided in a metal shell.

Figure 14:
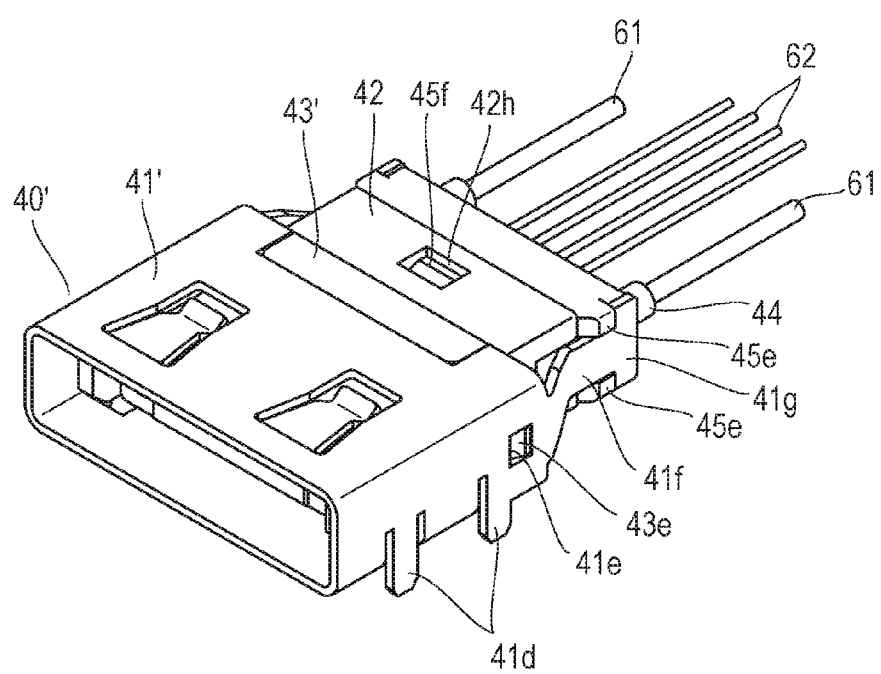
FIG. 14 is a perspective view showing another configuration example of a receptacle.
Figure 15:
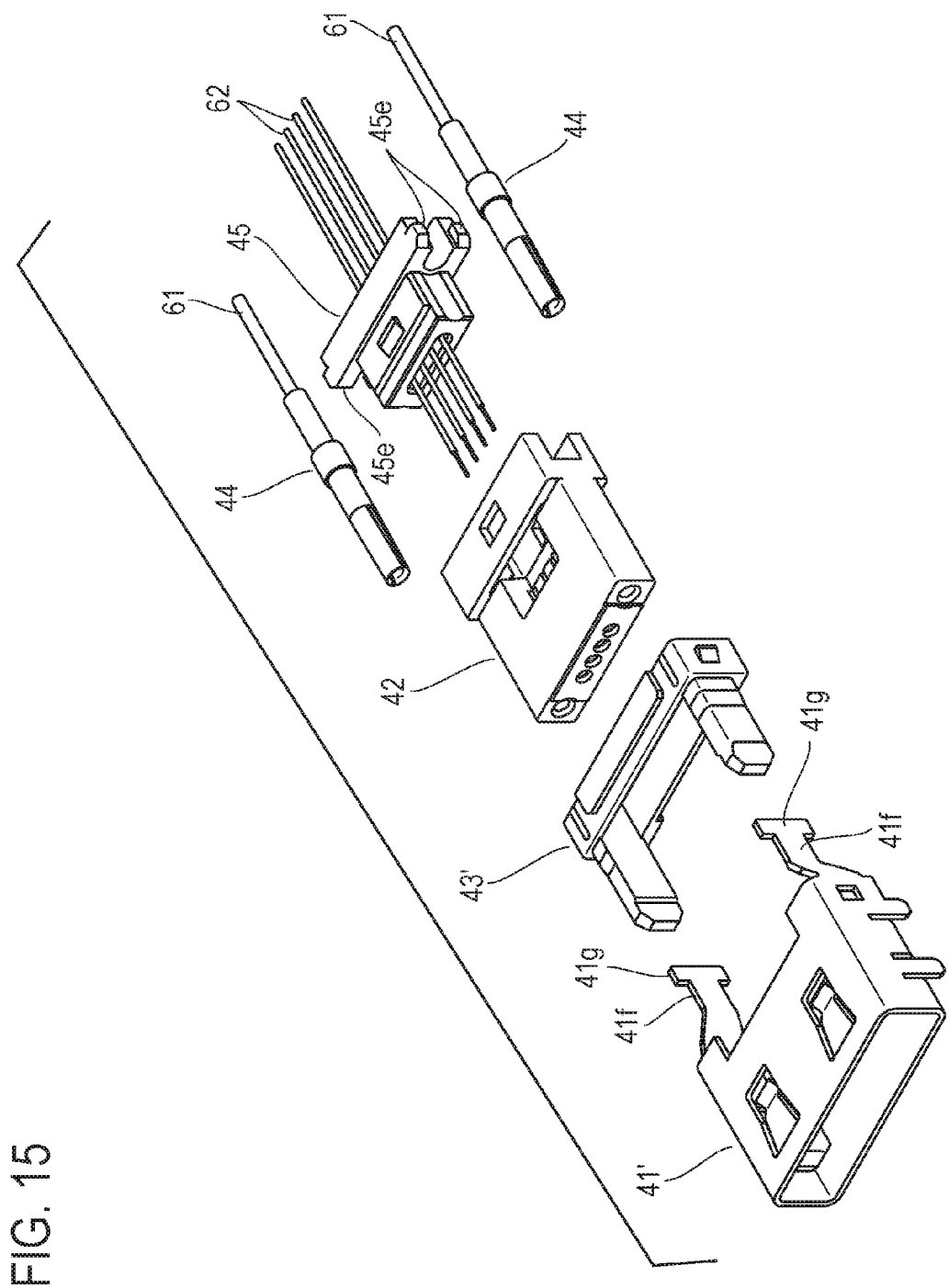
FIG. 15 is an exploded perspective view of the receptacle shown in FIG. 14.

FIG. 14 shows a receptacle 40' in which lock pieces are provided in a metal shell in this way. FIG. 15 is an exploded view showing parts of the receptacle 40' shown in FIG. 14. Elements equivalent to elements in FIGS. 3 and 8 are given the same reference characters.

A pair of lock pieces 41f are formed so as to be protrusively extended from both side walls of a metal shell 41' in a rear direction. The tip of each lock piece 41f has a wide width to form a lock part 41g. As shown in FIGS. 14 and 15, the pair of lock pieces 41f are bent so that the lock parts 41g are slightly closer to each other.

A heat-resistant guide 43' has a shape in which the pair of lock pieces 43c are removed from the heat-resistant guide 43 shown in FIG. 8.

Figure 16A:
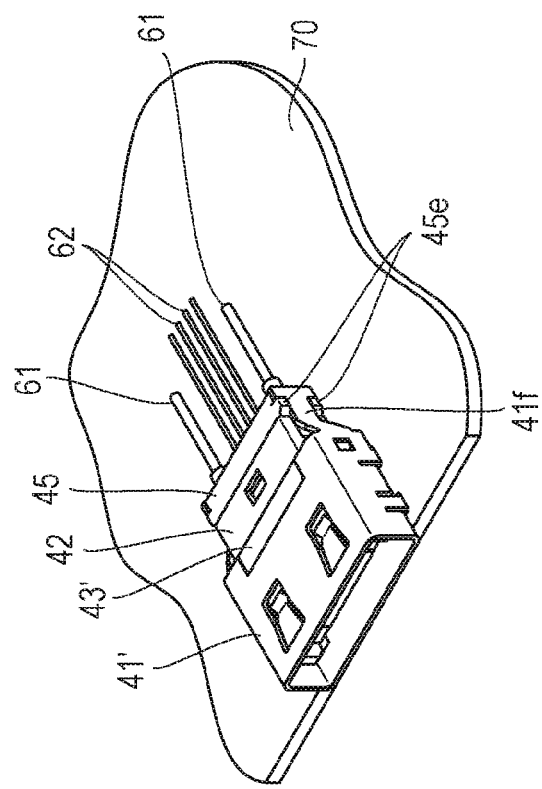
FIG. 16A is a diagram for illustrating how to mount the receptacle shown in FIG. 14 on a substrate.
Figure 16B:
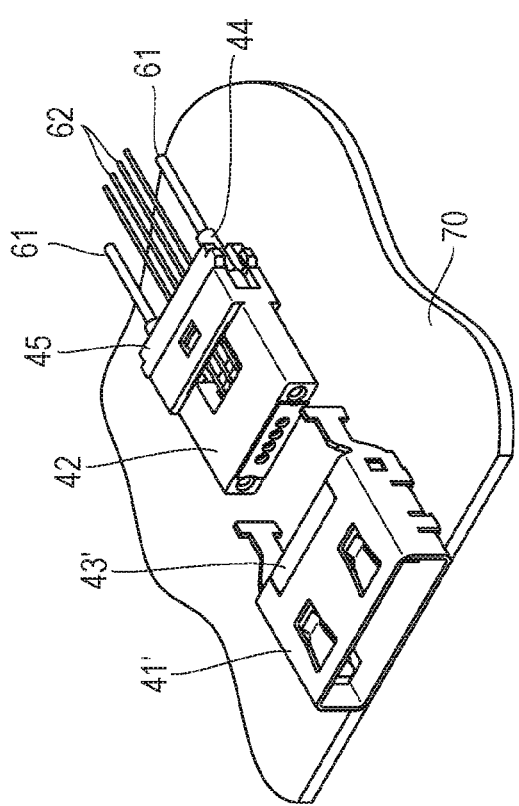
FIG. 16B is a diagram for illustrating how to mount the receptacle shown in FIG. 14 on the substrate.

FIGS. 16A, 16B, 17A, and 17B show how the receptacle 40' is reflow-mounted on the substrate 70, as in FIGS. 9A, 9B, 10A, and 10B above. As shown in FIGS. 16A and 17A, the optical part 42 is detached from a housing part and the housing part is reflow-mounted on the substrate 70. After the mounting, the optical part 42 is attached as shown in FIGS. 16B and 17B. The optical part 42 is fixed to the housing part when the pair of lock pieces 41f of the metal shell 41' catch in the lugs 45e of the block 45.

The lock pieces may be provided in the metal shell in this way. This also enables the optical part to be attached to or detached from the housing part.

Figure 18:
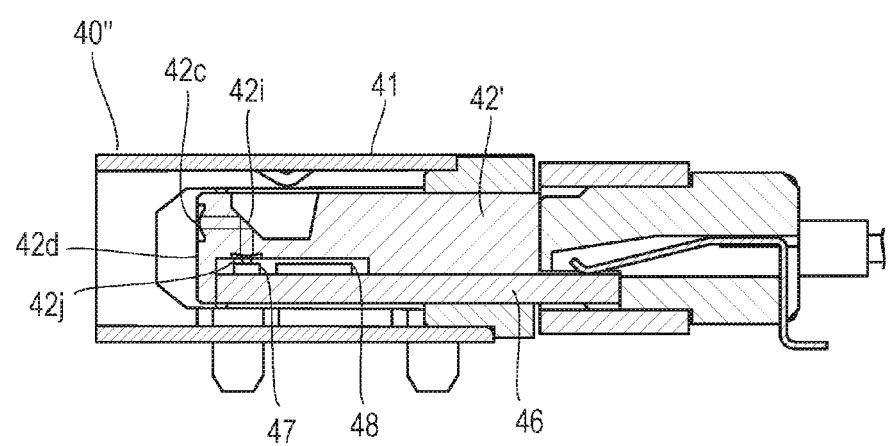
FIG. 18 is a cross-sectional view showing a configuration example of a receptacle that includes a photoelectric conversion circuit.

A configuration may also be used in which at least one of two connectors, which are a plug and a receptacle, includes a photoelectric conversion circuit. As an example of such a configuration, FIG. 18 shows a receptacle 40" that includes a photoelectric conversion circuit. In FIG. 18, reference numeral 46 denotes a circuit substrate, reference numeral 47 denotes a surface emitting laser (vertical cavity surface emitting laser (VCSEL)), and reference numeral 48 denotes an IC. A mirror surface 42i is formed in an optical part 42', and a condenser lens 42j is formed in a position for facing the surface emitting laser 47.

Various embodiments of an optoelectrical connector according to the present invention have been described above. According to the present invention, the optoelectrical composite connector can be smaller, lighter, and thinner, and is extremely suitable for mounting on portable electronic devices such as smartphones and tablets. On a portable electronic device, one of two connectors, which are a plug and a receptacle, is mounted; for example, the receptacle is mounted.

What is claimed is:

1. An optoelectrical connector including two connectors configured to be interconnected, each having at least one optical connection part and at least two electrical connection parts,
wherein the electrical connection parts of one of the connectors are pins and the electrical connection parts of the other connector are spring contacts,
the connector having the spring contacts includes, before the spring contacts, positioning holes in which the pins are configured to be inserted, and
tips of the pins are configured to come into contact with the spring contacts to make electrical connection, and bases of the pins are configured to fit in the positioning holes to position the at least one optical connection part of the two connectors for optical connection.

2. An optoelectrical connector including two connectors configured to be interconnected, each having at least one optical connection part and at least two electrical connection parts,
wherein the electrical connection parts of one of the connectors are first pins having spring contacts integrally provided at tips of the first pins, and the electrical connection parts of the other connector are second pins,
the connector having the second pins includes, before the second pins, positioning holes in which the first pins are configured to be inserted, and
the spring contacts at the tips of the first pins are configured to come into contact with the second pins to make electrical connection, and bases of the first pins are configured to fit in the positioning holes to position the at least one optical connection part of the two connectors for optical connection.

3. The optoelectrical connector according to claim 1, wherein a diameter of the base of the pin is larger than a diameter of the tip.

4. The optoelectrical connector according to claim 2 wherein
in a plane orthogonal to an extension direction of the first pins, for each of the first pins a diameter of a region occupied by the respective spring contact is smaller than a diameter of the respective base.

5. The optoelectrical connector according to claim 1, wherein the pins are positioned on both of sides of the one of the connectors so that the optical connection part is disposed between the pins.

6. The optoelectrical connector according to claim 2, wherein the first pins are positioned on both of sides of the one of the connectors so that the optical connection part is disposed between the first pins.

7. The optoelectrical connector according to claim 1, wherein
the two connectors each have metal shells, and
the metal shells are fitted when the two connectors are connected.

8. The optoelectrical connector according to claim 2, wherein
the two connectors each have metal shells, and
the metal shells are fitted when the two connectors are connected.

9. The optoelectrical connector according to claim 1, wherein
in at least one of the connectors an optical part is provided, which includes the optical connection part, the optical part is made of resin and is configured to transmit light, and
the pins are incorporated in the optical part.

10. The optoelectrical connector according to claim 2, wherein
in at least one of the connectors an optical part is provided, which includes the optical connection part, the optical part is made of resin and is configured to transmit light, and
the first pins are incorporated in the optical part.

11. The optoelectrical connector according to claim 5, wherein
in at least one of the connectors an optical part is provided, which includes the optical connection part, the optical part is made of resin and is configured to transmit light, and
the pins are incorporated in the optical part.

12. The optoelectrical connector according to claim 6, wherein
in at least one of the connectors an optical part is provided, which includes the optical connection part, the optical part is made of resin and is configured to transmit light, and
the first pins are incorporated in the optical part.

13. The optoelectrical connector according to claim 9, wherein the pins are incorporated in the optical part by press fitting.

14. The optoelectrical connector according to claim 10, wherein the first pins are incorporated in the optical part by press fitting.

15. The optoelectrical connector according to claim 11, wherein the pins are incorporated in the optical part by press fitting.

16. The optoelectrical connector according to claim 12, wherein the first pins are incorporated in the optical part by press fitting.

17. The optoelectrical connector according to claim 9, wherein the pins are incorporated in the optical part by insert molding.

18. The optoelectrical connector according to claim 10, wherein the first pins are incorporated in the optical part by insert molding.

19. The optoelectrical connector according to claim 11, wherein the pins are incorporated in the optical part by insert molding.

20. The optoelectrical connector according to claim 12, wherein the first pins are incorporated in the optical part by insert molding.

21. The optoelectrical connector according to claim 9, wherein the optical connection part comprises a lens that is integrally provided with the optical part.

22. The optoelectrical connector according to claim 10, wherein the optical connection part comprises a lens that is integrally provided with the optical part.

23. The optoelectrical connector according to claim 11, wherein the optical connection part comprises a lens that is integrally provided with the optical part.

24. The optoelectrical connector according to claim 12, wherein the optical connection part comprises a lens that is integrally provided with the optical part.

25. The optoelectrical connector according to claim 21, wherein
the lens is provided in a depression that is provided in a front end surface of the optical part, and
the lens does not protrude from the front end surface.

26. The optoelectrical connector according to claim 22, wherein
the lens is provided in a depression that is provided in a front end surface of the optical part, and
the lens does not protrude from the front end surface.

27. The optoelectrical connector according to claim 23, wherein
the lens is provided in a depression that is provided in a front end surface of the optical part, and
the lens does not protrude from the front end surface.

28. The optoelectrical connector according to claim 24, wherein
the lens is provided in a depression that is provided in a front end surface of the optical part, and
the lens does not protrude from the front end surface.

29. The optoelectrical connector according to claim 25, wherein a front edge face of the optical part in a portion in which the pins are incorporated is positioned behind the front end surface in which the depression is provided.

30. The optoelectrical connector according to claim 26, wherein a front edge face of the optical part in a portion in which the first pins are incorporated is positioned behind the front end surface in which the depression is provided.

31. The optoelectrical connector according to claim 27, wherein a front edge face of the optical part in a portion in which the pins are incorporated is positioned behind the front end surface in which the depression is provided.

32. The optoelectrical connector according to claim 28, wherein a front edge face of the optical part in a portion in which the first pins are incorporated is positioned behind the front end surface in which the depression is provided.

33. The optoelectrical connector according to claim 9, wherein a coil spring is provided behind the optical part.

34. The optoelectrical connector according to claim 10, wherein a coil spring is provided behind the optical part.

35. The optoelectrical connector according to claim 11, wherein a coil spring is provided behind the optical part.

36. The optoelectrical connector according to claim 12, wherein a coil spring is provided behind the optical part.

37. The optoelectrical connector according to claim 9, wherein the optical part is configured to be attached to and detached from a housing part for housing the optical part.

38. The optoelectrical connector according to claim 10, wherein the optical part is configured to be attached to and detached from a housing part for housing the optical part.

39. The optoelectrical connector according to claim 11, wherein the optical part is configured to be attached to and detached from a housing part for housing the optical part.

40. The optoelectrical connector according to claim 12, wherein the optical part is configured to be attached to and detached from a housing part for housing the optical part.

41. The optoelectrical connector according to claim 37, wherein
the housing part includes a metal shell and a heat-resistant guide that is fixed in the metal shell and that positions the optical part, and
a lock piece, that is configured to fix the optical part, is integrally provided with the heat-resistant guide.

42. The optoelectrical connector according to claim 38, wherein
the housing part includes a metal shell and a heat-resistant guide that is fixed in the metal shell and that positions the optical part, and
a lock piece, that is configured to fix the optical part, is integrally provided with the heat-resistant guide.

43. The optoelectrical connector according to claim 39, wherein
the housing part includes a metal shell and a heat-resistant guide that is fixed in the metal shell and that positions the optical part, and
a lock piece, that is configured to fix the optical part, is integrally provided with the heat-resistant guide.

44. The optoelectrical connector according to claim 40, wherein
the housing part includes a metal shell and a heat-resistant guide that is fixed in the metal shell and that positions the optical part, and
a lock piece, that is configured to fix the optical part, is integrally provided with the heat-resistant guide.

45. The optoelectrical connector according to claim 37, wherein
the housing part includes a metal shell and a heat-resistant guide that is fixed in the metal shell and that positions the optical part, and
a lock piece, that is configured to fix the optical part, is integrally provided with the metal shell.

46. The optoelectrical connector according to claim 38, wherein
the housing part includes a metal shell and a heat-resistant guide that is fixed in the metal shell and that positions the optical part, and
a lock piece, that is configured to fix the optical part, is integrally provided with the metal shell.

47. The optoelectrical connector according to claim 39, wherein
the housing part includes a metal shell and a heat-resistant guide that is fixed in the metal shell and that positions the optical part, and
a lock piece, that is configured to fix the optical part, is integrally provided with the metal shell.

48. The optoelectrical connector according to claim 40, wherein
the housing part includes a metal shell and a heat-resistant guide that is fixed in the metal shell and that positions the optical part, and
a lock piece, that is configured to fix the optical part, is integrally provided with the metal shell.

49. The optoelectrical connector according to claim 1, wherein at least one of the two connectors includes a photoelectric conversion circuit.

50. The optoelectrical connector according to claim 2, wherein at least one of the two connectors includes a photoelectric conversion circuit.

51. A portable electronic device on which one of the two connectors in the optoelectrical connector according to claim 1 is mounted.

52. A portable electronic device on which one of the two connectors in the optoelectrical connector according to claim 2 is mounted.

* * * * *